H. C. FAIRCHILD.
Hand-Seeder.

No. 70,541. Patented Nov. 5, 1867.

WITNESSES:

INVENTOR:
H. C. Fairchild
Per Munn & Co.
Attorneys

United States Patent Office.

H. C. FAIRCHILD, OF BROOKLYN, PENNSYLVANIA.

Letters Patent No. 70,541, dated November 5, 1867.

IMPROVEMENT IN SEED-PLANTERS.

The Schedule referred to in these Letters Patent and making part of the same.

TO ALL WHOM IT MAY CONCERN:

Be it known that I, H. C. FAIRCHILD, of Brooklyn, in the county of Susquehanna, and State of Pennsylvania, have invented a new and improved Gauge for Seed-Planters; and I do hereby declare that the following is a full, clear, and exact description thereof, which will enable those skilled in the art to make and use the same, reference being had to the accompanying drawings, forming part of this specification.

This invention relates to improvements made in a seed-planter for which Letters Patent of the United States were granted me in 1860; and the invention consists in such a construction and arrangement of the gauge that it can be set on the corn-hopper from the outside, as will be hereinafter described.

Similar letters of reference indicate corresponding parts.

A represents the cylinder; B is the plunger; C is the mouth-piece; D represents the gauge, which, when using the planter, is partially rotated by the plunger between two stationary disks in the cylinder. By adjusting this gauge the orifice E is enlarged or diminished in size, and the quantity of seed which is delivered is determined thereby. The gauge or slide D is operated by a screw, marked $a$, which is fixed as regards its longitudinal motion, but which may be rotated by a screw-driver. This screw passes through and engages with an arm, $c$, which forms a nut for it. This arm is attached to the slide D, so that when the screw is turned or revolved the result is that the arm $c$, with the slide or gauge D, is moved back and forth over the orifice E, thus diminishing or increasing the quantity of seed delivered, as may be desired.

Figure 1:
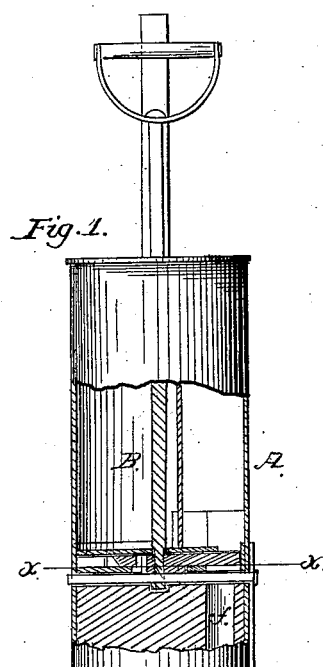
Figure 1 represents a vertical longitudinal view of a hand-planter, partly in section, in order to show to better advantage the interior arrangement.
Figure 2:
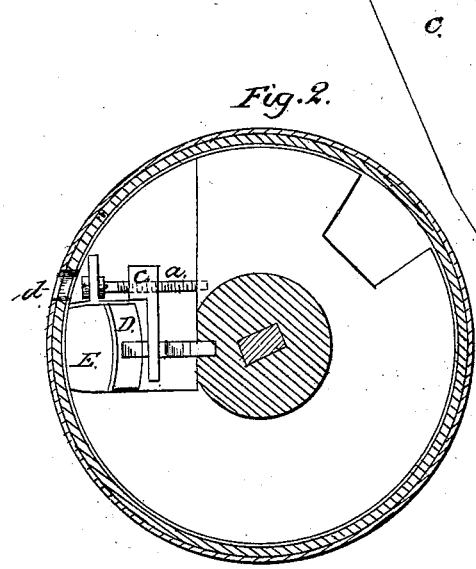
Figure 2 is a cross or horizontal section of the same through the line $x\, x$, on an enlarged scale, showing the gauge and the manner of its adjustment.

In my patented planter (before alluded to) it is extremely difficult to operate or change the gauge. By my present arrangement it is done with the greatest facility. $d$ is a hole through the cylinder, which gives access to the screw $a$, and with a common screw-driver the position of the gauge can be altered in a moment's time. $f$, fig. 1, is the aperture through which the seed passes into the mouth C.

In operating with the planter the plunger-rod B is partially rotated by the hand. As the mouth is inserted into the earth the planter is carried and supported by the other hand with the curved handle, as seen in red lines in fig. 1.

Having thus described my invention, I claim as new, and desire to secure by Letters Patent—

1. The slide D, operated from the outside by the screw $a$ and the arm $c$, substantially as described.
2. The hole $d$ through the cylinder, substantially as and for the purposes herein set forth.

H. C. FAIRCHILD.

Witnesses:
   C. ROGERS,
   A. TUTSWORTH.